(12) United States Patent
Chang et al.

(10) Patent No.: US 12,253,789 B2
(45) Date of Patent: Mar. 18, 2025

(54) WEBCAM MODULE

(71) Applicant: ViewSonic International Corporation, New Taipei (TW)

(72) Inventors: Chi-Chung Chang, New Taipei (TW); Chyun-Roh Lin, New Taipei (TW)

(73) Assignee: ViewSonic International Corporation, New Taipei (TW)

(*) Notice: Subject to any disclaimer, the term of this patent is extended or adjusted under 35 U.S.C. 154(b) by 703 days.

(21) Appl. No.: 17/535,582

(22) Filed: Nov. 25, 2021

(65) Prior Publication Data
US 2022/0171258 A1 Jun. 2, 2022

(30) Foreign Application Priority Data
Nov. 30, 2020 (TW) ................................ 109142066

(51) Int. Cl.
*G03B 11/04* (2021.01)
*G03B 17/02* (2021.01)
(Continued)

(52) U.S. Cl.
CPC ............ *G03B 11/04* (2013.01); *G03B 11/043* (2013.01); *G03B 17/02* (2013.01); *G03B 17/561* (2013.01);
(Continued)

(58) Field of Classification Search
CPC ...... G06F 1/1686; H04N 23/57; H04N 23/58; H04N 23/695; G03B 11/04; G03B 11/043; G03B 17/00; G03B 17/02
See application file for complete search history.

(56) References Cited

U.S. PATENT DOCUMENTS 6,812,958 B1 * 11/2004 Silvester ................ H04N 23/51
  348/E5.026
8,641,302 B2 * 2/2014 Kao ...................... G06F 1/1686
  396/428
(Continued)

FOREIGN PATENT DOCUMENTS

KR 101414617 B1 * 7/2014 ............. H04N 23/57
TW 201017467     5/2010
(Continued)

OTHER PUBLICATIONS

"Office Action of Taiwan Counterpart Application", issued on Dec. 30, 2021, p. 1-p. 12.

*Primary Examiner* — Wyatt A Stoffa
*Assistant Examiner* — Alex Park Rickel
(74) *Attorney, Agent, or Firm* — JCIPRNET

(57) ABSTRACT

A webcam module, including a front casing, a rear casing, a support base, a lens, a blocking cover, and a lever, is provided. The front casing has a lens hole. The rear casing is disposed at the front casing and forms an accommodating space. The support base is rotatably disposed in the accommodating space. The lens is disposed on a front side surface of the support base facing the front casing. The blocking cover is slidably sleeved around the support base and faces the front casing. The lever is connected to the blocking cover and protrudes above the front casing and the rear casing. The lever is adapted to drive the blocking cover to slide along the support base. The lever is adapted to drive the blocking cover and the support base to rotate relative to the front casing with an axis as the center.

10 Claims, 15 Drawing Sheets

(51) Int. Cl.
  *G03B 17/56* (2021.01)
  *G06F 1/16* (2006.01)
  *H04N 23/55* (2023.01)
  *H04N 23/57* (2023.01)
(52) U.S. Cl.
  CPC ........... *G06F 1/1686* (2013.01); *H04N 23/55* (2023.01); *H04N 23/57* (2023.01)

(56) References Cited

U.S. PATENT DOCUMENTS

| | | | | |
|---|---|---|---|---|
| 8,823,870 B2 * | 9/2014 | Tsai | ...................... | G06F 1/1686 348/376 |
| 10,761,404 B2 * | 9/2020 | Leimer | ................ | G03B 11/043 |
| 11,178,319 B2 * | 11/2021 | Li | .......................... | H04N 23/57 |
| 11,226,466 B2 * | 1/2022 | Wang | ..................... | G02B 26/02 |

FOREIGN PATENT DOCUMENTS

| | | |
|---|---|---|
| TW | 201312252 | 3/2013 |
| TW | M589815 | 1/2020 |

* cited by examiner

WEBCAM MODULE

CROSS-REFERENCE TO RELATED APPLICATION

This application claims the priority benefit of Taiwan application serial no. 109142066, filed on Nov. 30, 2020. The entirety of the above-mentioned patent application is hereby incorporated by reference herein and made a part of this specification.

BACKGROUND

Technical Field

The disclosure relates to a webcam module, and particularly relates to a webcam module adapted to hide a lens and adjust an angle.

Description of Related Art

The existing laptop or tablet usually has a built-in webcam module. The built-in webcam module is configured to capture photos or record videos. However, most built-in webcam modules are fixed onto a housing of a computer and directly face the user, so the angle and the position cannot be adjusted.

When the computer is hacked by a hacker, the webcam module may be directly controlled to monitor the user through the lens, which will leak personal privacy information. In addition, since the webcam module is fixed onto the computer, the capturing angle cannot be arbitrarily adjusted, which limits the capturing function of the webcam module.

SUMMARY

The disclosure provides a webcam module adapted to translate and hide a lens to prevent personal privacy from leaking. The webcam module is adapted to rotate to adjust a capturing angle, so as to adapt to the environment and the requirements of users.

The webcam module of the disclosure includes a front casing, a rear casing, a support base, a lens, a blocking cover, and a lever. The front casing has a lens hole. The rear casing is disposed at the front casing and forms an accommodating space. The support base is rotatably disposed in the accommodating space. The lens is disposed on a front side surface of the support base facing the front casing or may be disposed backward opposite to the front casing. The blocking cover is slidably sleeved around the support base and faces the front casing. The lever is connected to the blocking cover and protrudes above the front casing and the rear casing. The lever is adapted to drive the blocking cover to slide along the support base. The lever is adapted to drive the blocking cover and the support base to rotate relative to the front casing with an axis as a center.

The webcam module of the disclosure includes a front casing, a rear casing, a support base, a lens, and a lever. The front casing has a lens hole. The rear casing is disposed at the front casing and forms an accommodating space. The support base is rotatably disposed in the accommodating space. The lens is disposed on a front side surface of the support base facing the front casing. The lever is connected to the support base and protrudes above the front casing and the rear casing. The lever is adapted to drive the support base to slide along an axis to switch to a turn-on mode or a privacy mode. The lever is adapted to drive the support base to rotate relative to the front casing with an axis as a center.

Based on the above, the webcam module of the disclosure drives the blocking cover to slide along the support base or drives the support base to slide along the axis through the lever, so as to switch the lens to the turn-on mode or the privacy mode. In the turn-on mode, the lens is displayed in the lens hole to facilitate capturing. In the privacy mode, the lens is blocked through the blocking cover or the lens is hidden in the front casing, so that the lens cannot be displayed in the lens hole. Even if a third party remotely controls the lens of the webcam module, under the physical blocking of the blocking cover or the front casing, the third party still cannot infringe on personal privacy through the webcam module.

In addition, the webcam module of the disclosure may directly or indirectly drive the support base to rotate relative to the front casing through the lever to adjust the capturing angle of the lens in the lens hole, so as to adapt to the intensity of the ambient light or present different capturing effects.

DETAILED DESCRIPTION OF DISCLOSED EMBODIMENTS

Figure 1A:
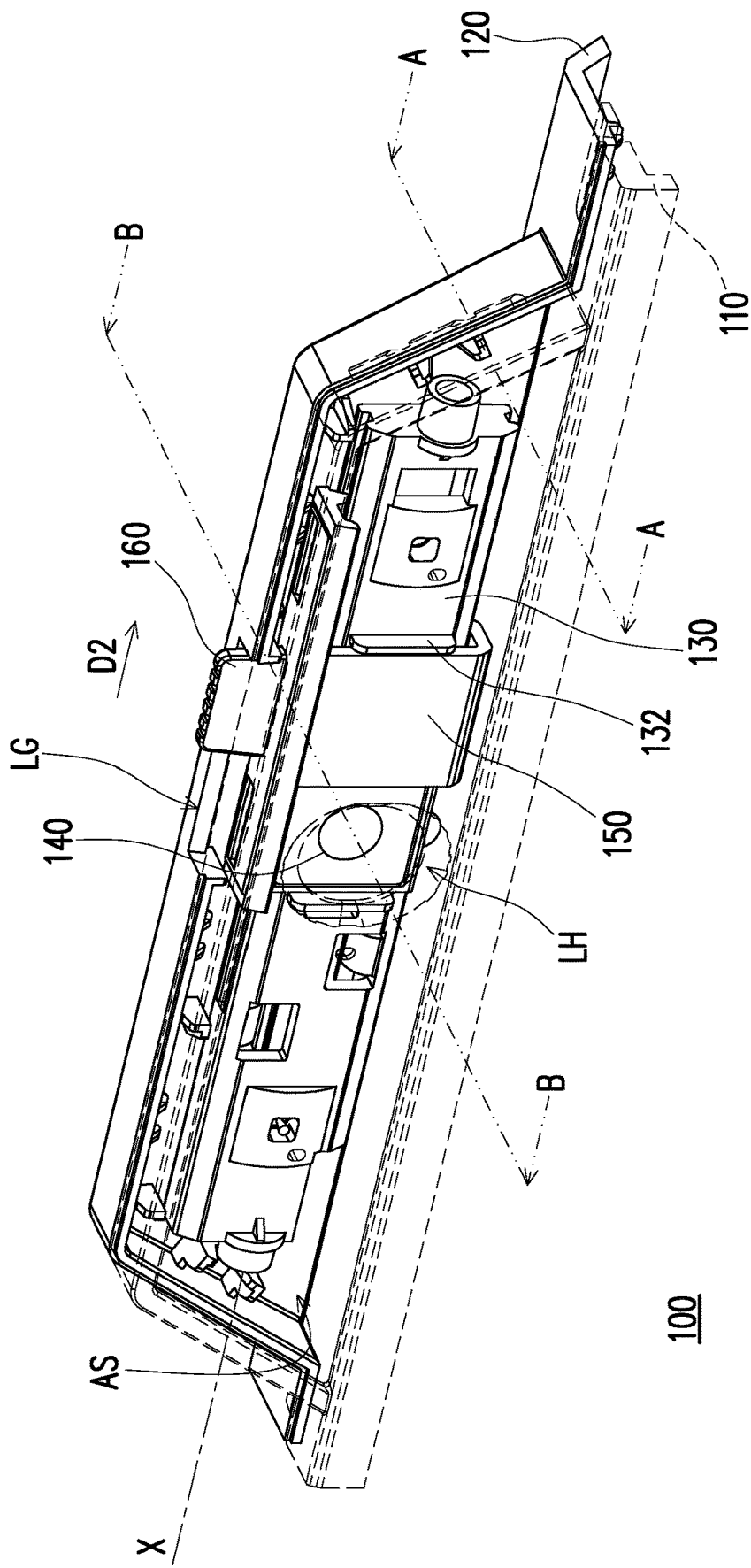
FIG. 1A is a three-dimensional perspective schematic view of a webcam module in a turn-on mode according to an embodiment of the disclosure.
Figure 1B:
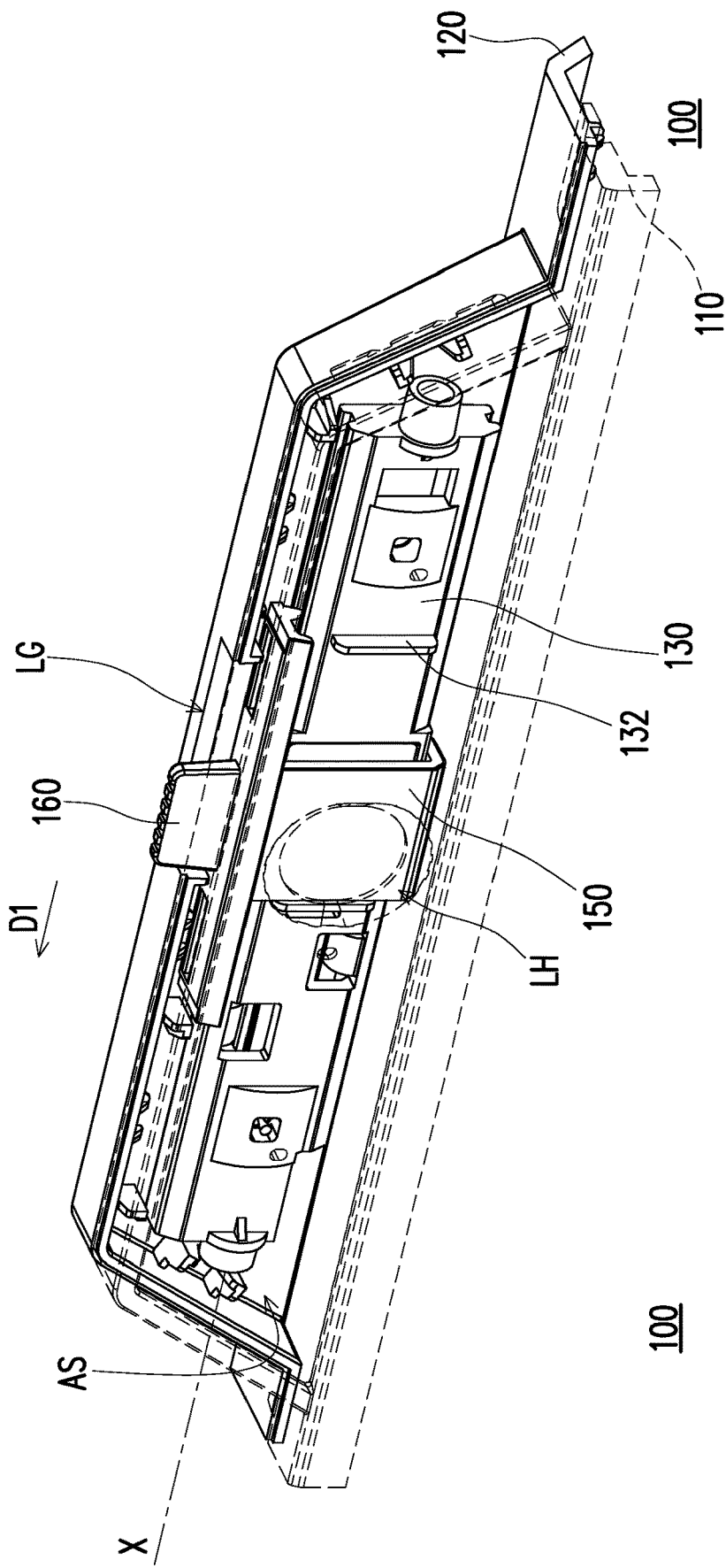
FIG. 1B is a three-dimensional perspective schematic view of the webcam module of FIG. 1A in a privacy mode.
Figure 1C:
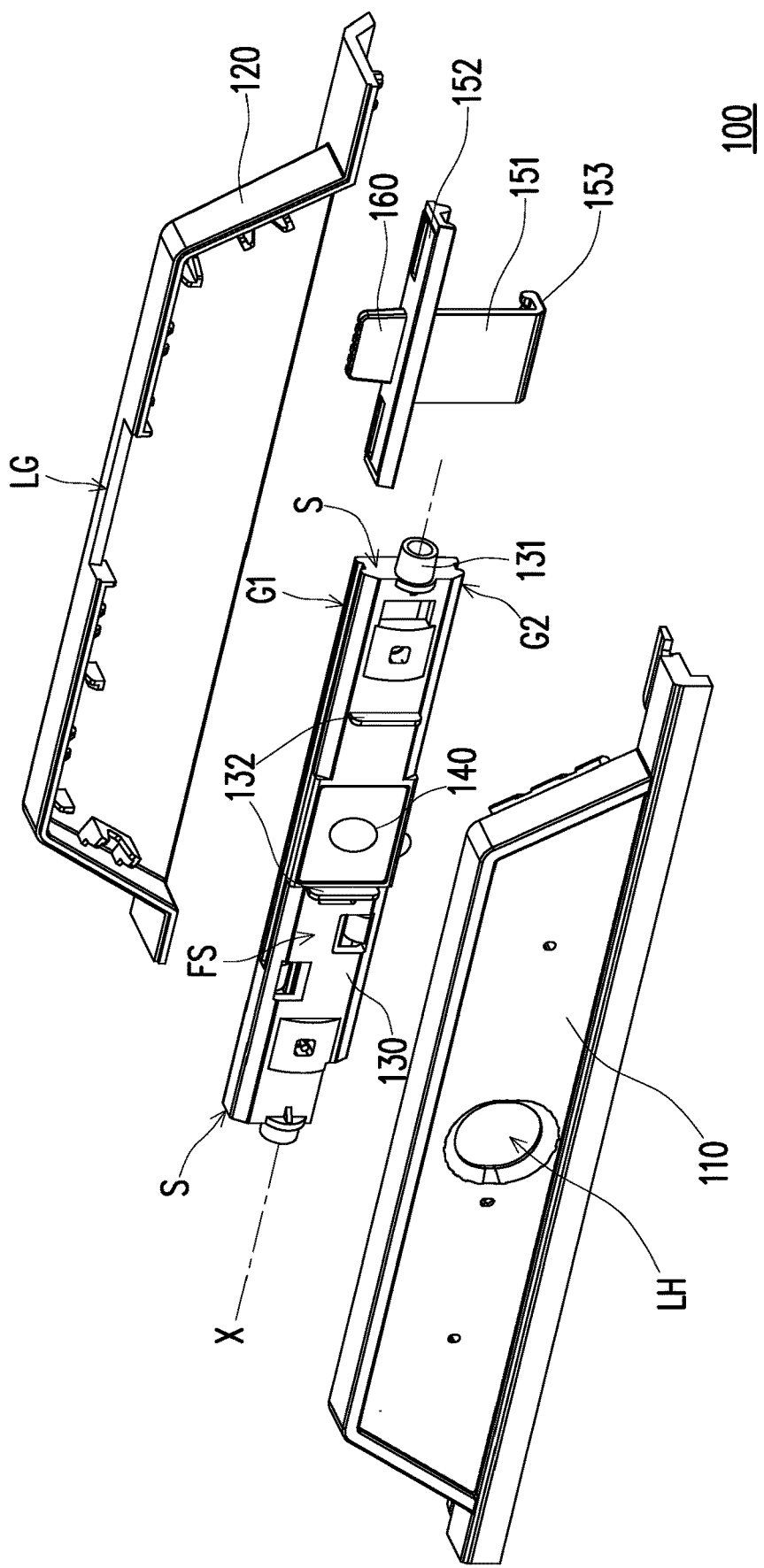
FIG. 1C is an exploded schematic view of elements of the webcam module of FIG. 1A.
Figure 1D:
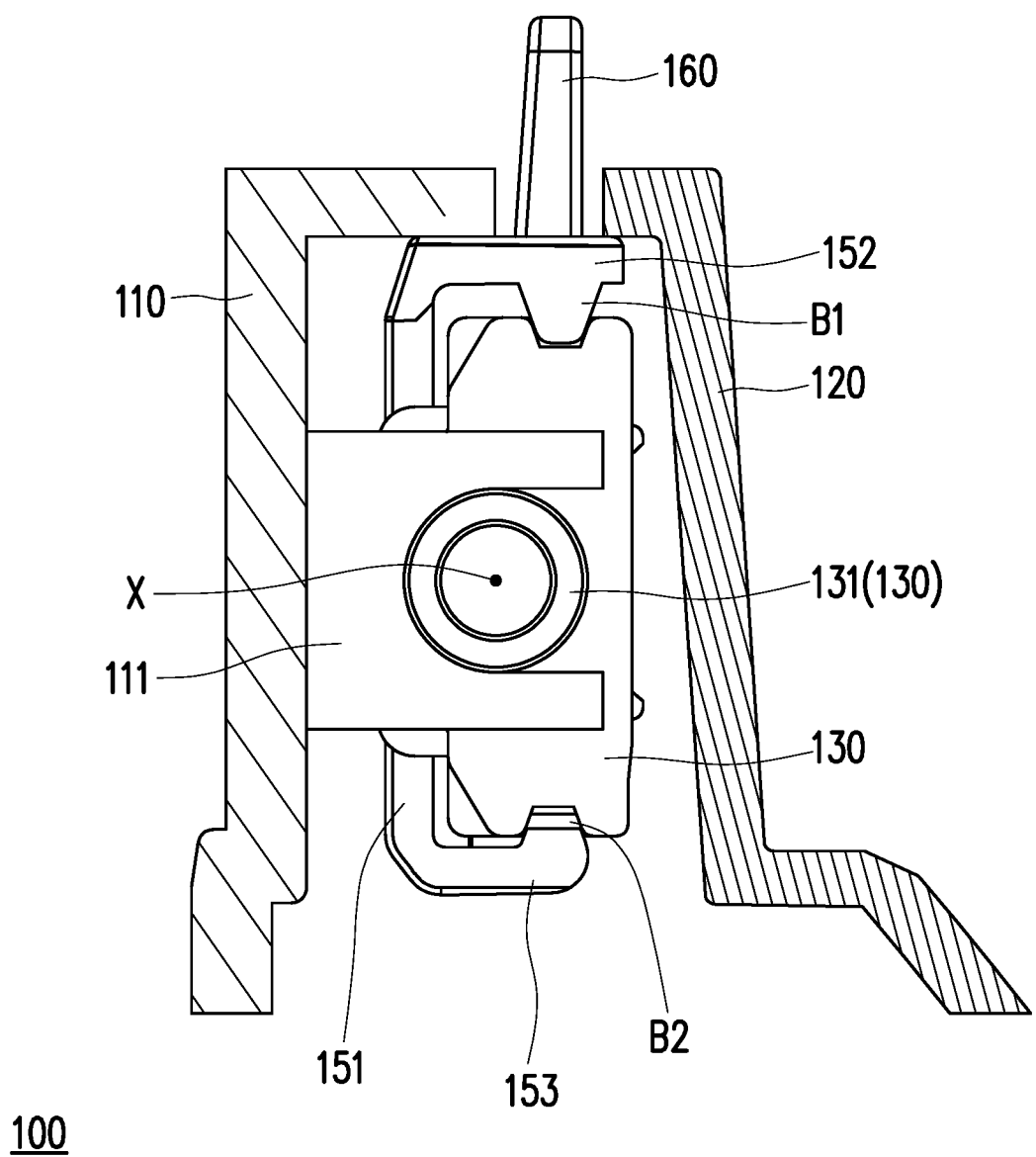
FIG. 1D is a cross-sectional schematic view of the webcam module of FIG. 1A along an A-A line segment.

FIG. 1A is a three-dimensional perspective schematic view of a webcam module in a turn-on mode according to an embodiment of the disclosure. FIG. 1B is a three-dimensional perspective schematic view of the webcam module of FIG. 1A in a privacy mode. FIG. 1C is an exploded schematic view of elements of the webcam module of FIG. 1A. FIG. 1D is a cross-sectional schematic view of the webcam module of FIG. 1A along an A-A line segment.

Please refer to FIG. 1A to FIG. 1B at the same time. A webcam module 100 of the disclosure is, for example, disposed in a notebook computer, a tablet computer, a desktop computer, or other similar electronic devices (not shown in the drawings). The webcam module 100 is disposed on one side of the electronic device facing the user to facilitate capturing of an image or a video, and the webcam module 100 may send the real-time image to the cloud through the network, so as to share the image or conduct a video conference.

Please refer to FIG. 1A to FIG. 1D. The webcam module 100 of the disclosure includes a front casing 110, a rear casing 120, a support base 130, a lens 140, a blocking cover 150, and a lever 160.

The front casing 110 has a lens hole LH. The rear casing 120 is disposed at the front casing 110 and forms an accommodating space AS. The support base 130 is a long structure and is rotatably disposed in the accommodating space AS. The lens 140 is disposed on a front side surface FS of the support base 130 facing the front casing 110. The lens 140 adopts, for example, a light-sensing charge coupled device (CCD) or a complementary metal oxide semiconductor (CMOS). The blocking cover 150 is slidably sleeved around the support base 130 and faces the front casing 110, that is, the blocking cover 150 is located between the support base 130 and the front casing 110. In other embodiments, the lens may also be disposed backward opposite to the front casing.

The lever 160 is connected to the blocking cover 150 and protrudes above the front casing 110 and the rear casing 120. In detail, the rear casing 120 has a limiting groove LG communicated with the accommodating space AS, and the lever 160 is movably located in the limiting groove LG. As such, the width and the length of the limiting groove LG are greater than the lever 160, so that the lever 160 has a translating stroke and a rotating stroke in the limiting groove LG.

Please refer to FIG. 1A and FIG. 1B. The lever 160 is adapted to drive the blocking cover 150 to slide along the support base 130 and pass through an axis X of the support base 130 in parallel to switch to a turn-on mode (see FIG. 1A) or a privacy mode (see FIG. 1B).

In detail, when the lever 160 drives the blocking cover 150 to slide along the support base 130 toward a first direction D1, the blocking cover 150 slides between the lens 140 and the lens hole LH to block the lens 140, which is the privacy mode at this time to prevent the lens 140 from displaying in the lens hole LH (see FIG. 1B). When the lever 160 drives the blocking cover 150 to slide along the support base 130 toward a second direction D2 opposite to the first direction D1, the blocking cover 150 is away from the lens 140 and the lens hole LH, and the lens 140 is displayed in the lens hole LH, which is the turn-on mode at this time.

With reference to FIG. 1A to FIG. 1D, the support base 130 has two rotating shafts 131, which are respectively disposed on two side surfaces S of the support base 130 relative to the lens 140, and the axis X passes through the center of the two rotating shafts 131. The front casing 110 has two bearings 111, and the two rotating shafts 131 are respectively pivotally connected to the two bearings 111. In detail, the bearing 111 is, for example, a plate-shaped structure and has rotating holes. Each rotating shaft 131 is rotatably penetrated through each rotating hole. The pivoting of the support base 130 on the axis X may be maintained through the limiting of the bearings. In other embodiments, the two bearings may also be formed on the rear casing, which is not limited in the disclosure.

Please refer to FIG. 1C and FIG. 1D. More specifically, the blocking cover 150 has a baffle plate 151, an upper slide plate 152 and a lower slide plate 153. The baffle plate 151 overlaps with the front side surface FS of the support base 130. The upper slide plate 152 and the lower slide plate 153 are respectively formed on the upper and lower ends of the baffle plate 151 and slidably clamp the support base 130. In detail, the support base 130 has an upper groove G1 and a lower groove G2, which are both parallel to the axis X. The upper groove G1 partially overlaps with the limiting groove LG of the rear casing 120. A slide block B1 of the upper slide plate 152 and a slide block B2 of the lower slide plate 153 are respectively slidably engaged with the upper groove G1 and the lower groove G2. Through the connection relationship of the upper groove G1, the lower groove G2, and the slide blocks B1 and B2, the linear sliding of the blocking cover 150 along the axis X on the support base 130 may be ensured.

Figure 2A:
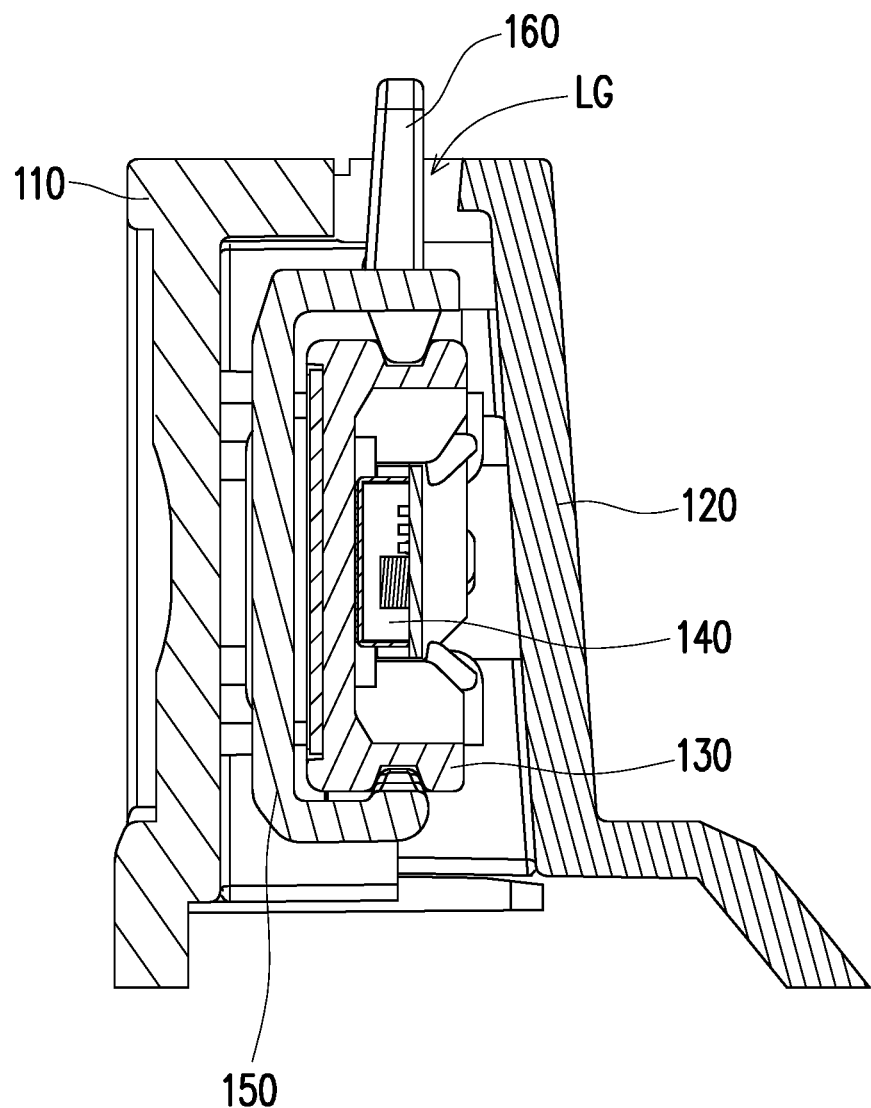
FIG. 2A is a cross-sectional schematic view of the webcam module of FIG. 1A along a B-B line segment.
Figure 2B:
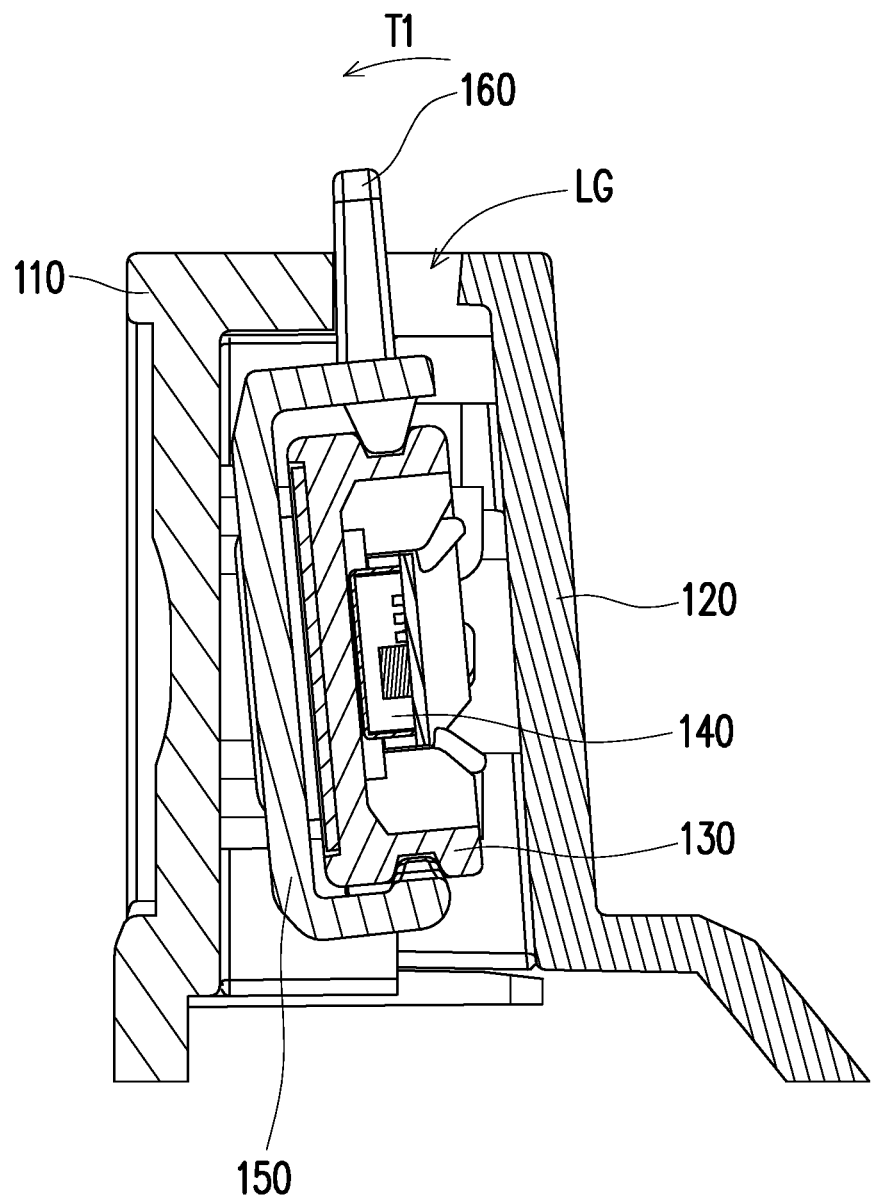
FIG. 2B is a cross-sectional schematic view of the webcam module of FIG. 2A rotating toward a first rotating direction.
Figure 2C:
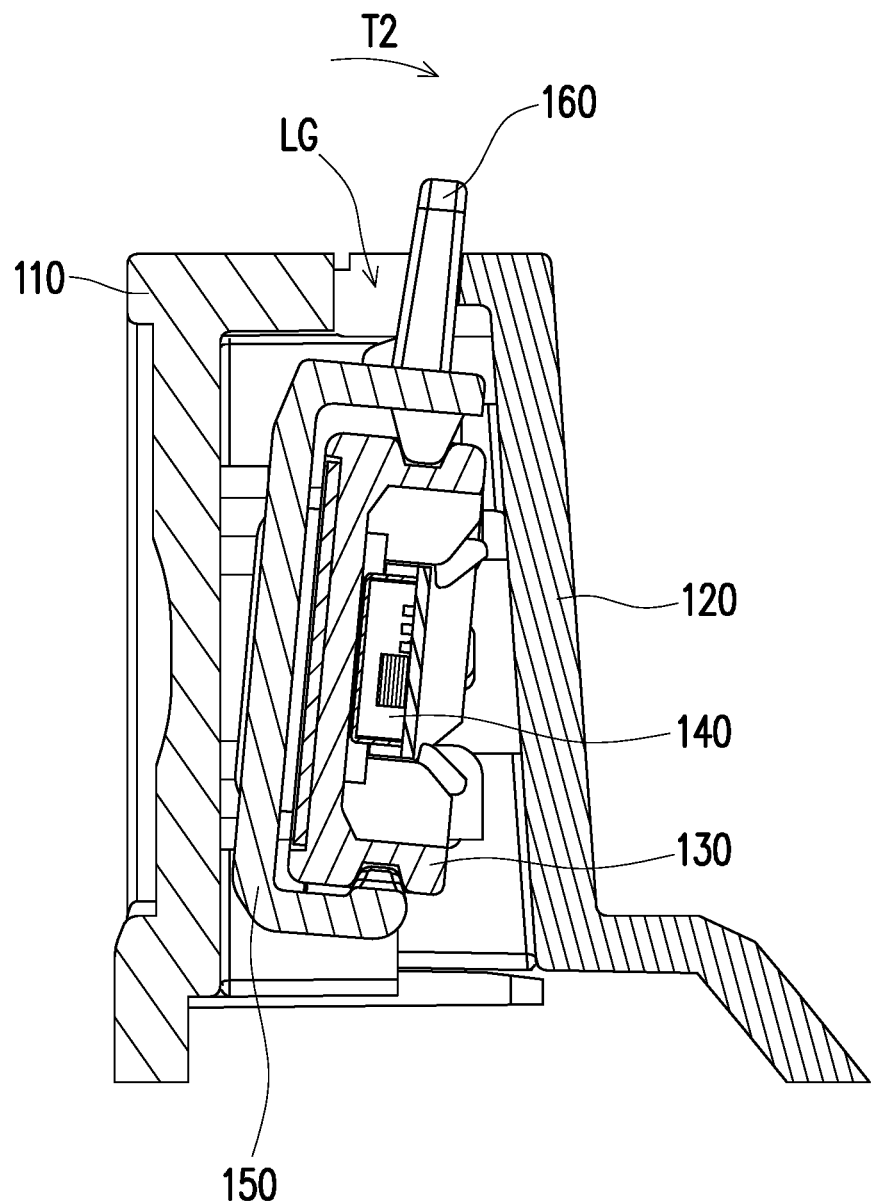
FIG. 2C is a cross-sectional schematic view of the webcam module of FIG. 2A rotating toward a second rotating direction.

FIG. 2A is a cross-sectional schematic view of the webcam module of FIG. 1A along a B-B line segment. FIG. 2B is a cross-sectional schematic view of the webcam module of FIG. 2A rotating toward a first rotating direction. FIG. 2C is a cross-sectional schematic view of the webcam module of FIG. 2A rotating toward a second rotating direction.

Please refer to FIG. 2A to FIG. 2C and FIG. 1D. The lever 160 is adapted to drive the blocking cover 150 and the support base 130 to rotate relative to the front casing 110 with the axis X as the center.

In detail, please refer to FIG. 2A. When the support base 130 is not rotating, the lever 160 is located in the limiting groove LG and the support base 130 is parallel to the front casing 110. Please refer to FIG. 2B. When the support base 130 rotates toward a first rotating direction T1, the lever 160 abuts the front casing 110 in the limiting groove LG, so that the support base 130 and the lens 140 tilt forward relative to the front casing 110. Please refer to FIG. 2C. When the support base 130 rotates toward a second rotating direction T2 opposite to the first rotating direction T1, the lever 160 abuts the rear casing 120 in the limiting groove LG, so that the support base 130 and the lens 140 tilt backward relative to the front casing 110.

Please refer to FIG. 1A to FIG. 1C. The support base 130 has two baffles 132, which extend to be formed on the front side surface FS of the support base 130 and are respectively located on two sides of the blocking cover 150 to limit a sliding stroke of the blocking cover 150 on the support base 130.

Figure 3A:
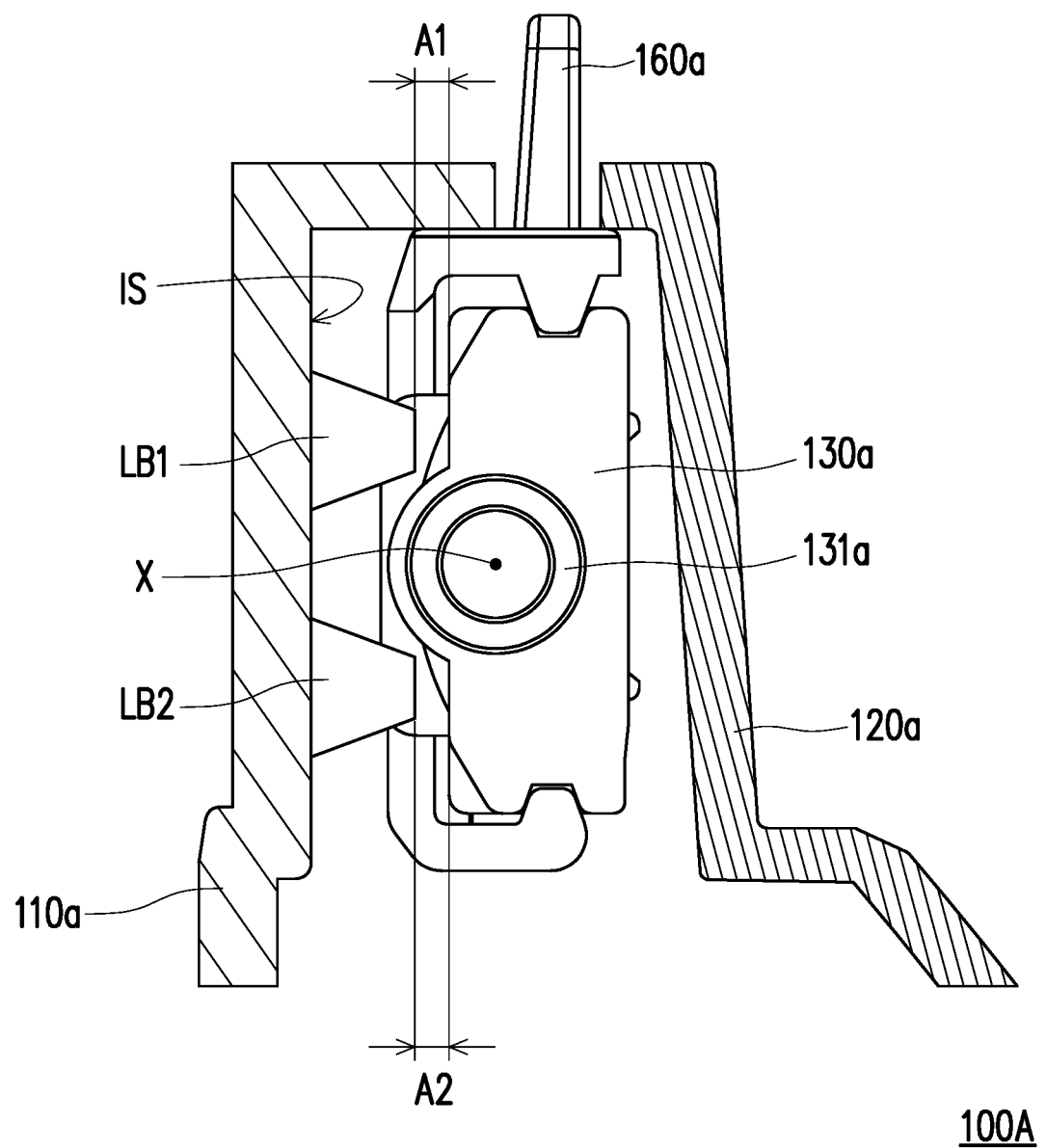
FIG. 3A is a side schematic view of a webcam module combined with a first limiting block and a second limiting block according to another embodiment of the disclosure.
Figure 3B:
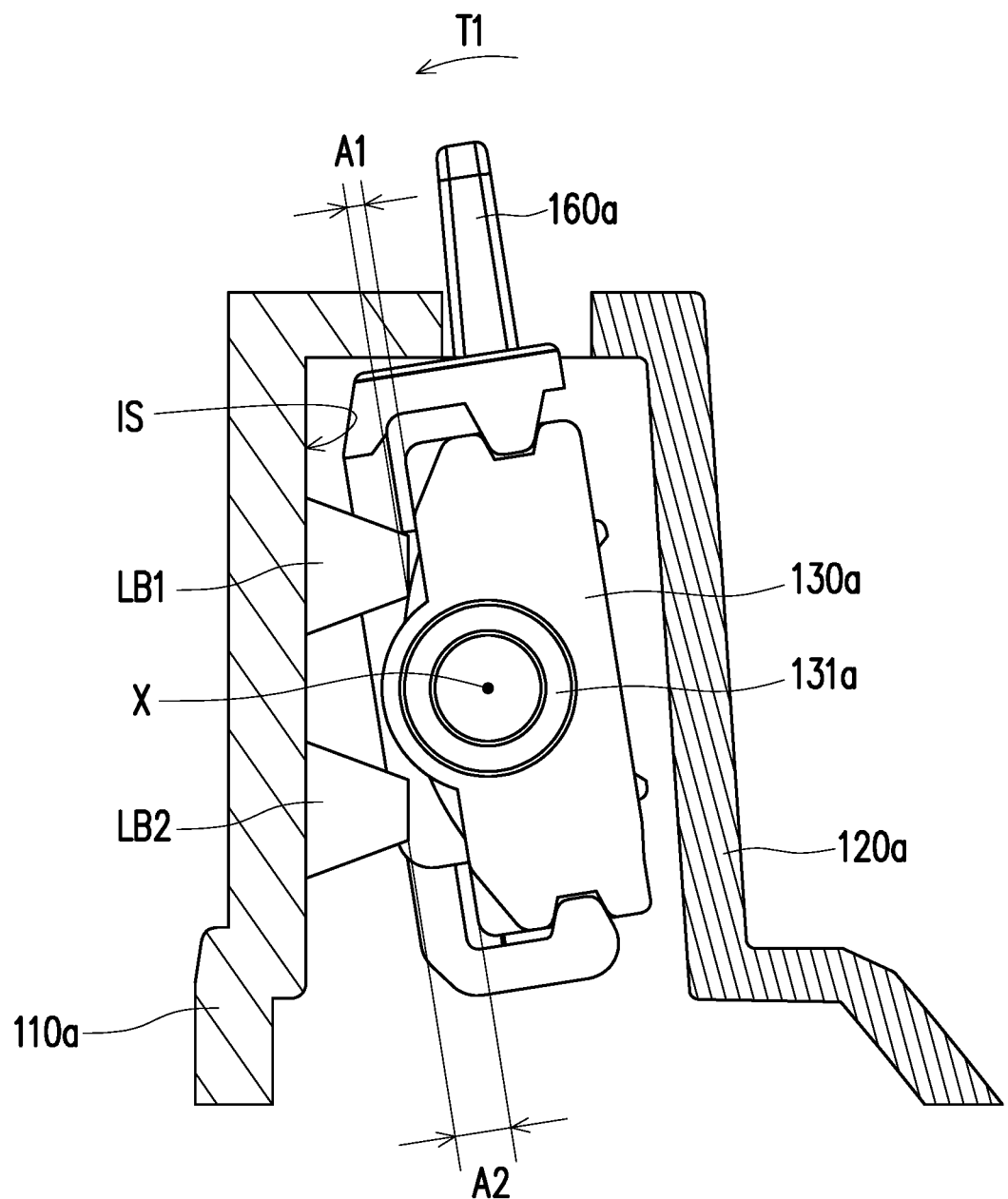
FIG. 3B is a side schematic view of the webcam module of FIG. 3A rotating toward a first rotating direction.
Figure 3C:
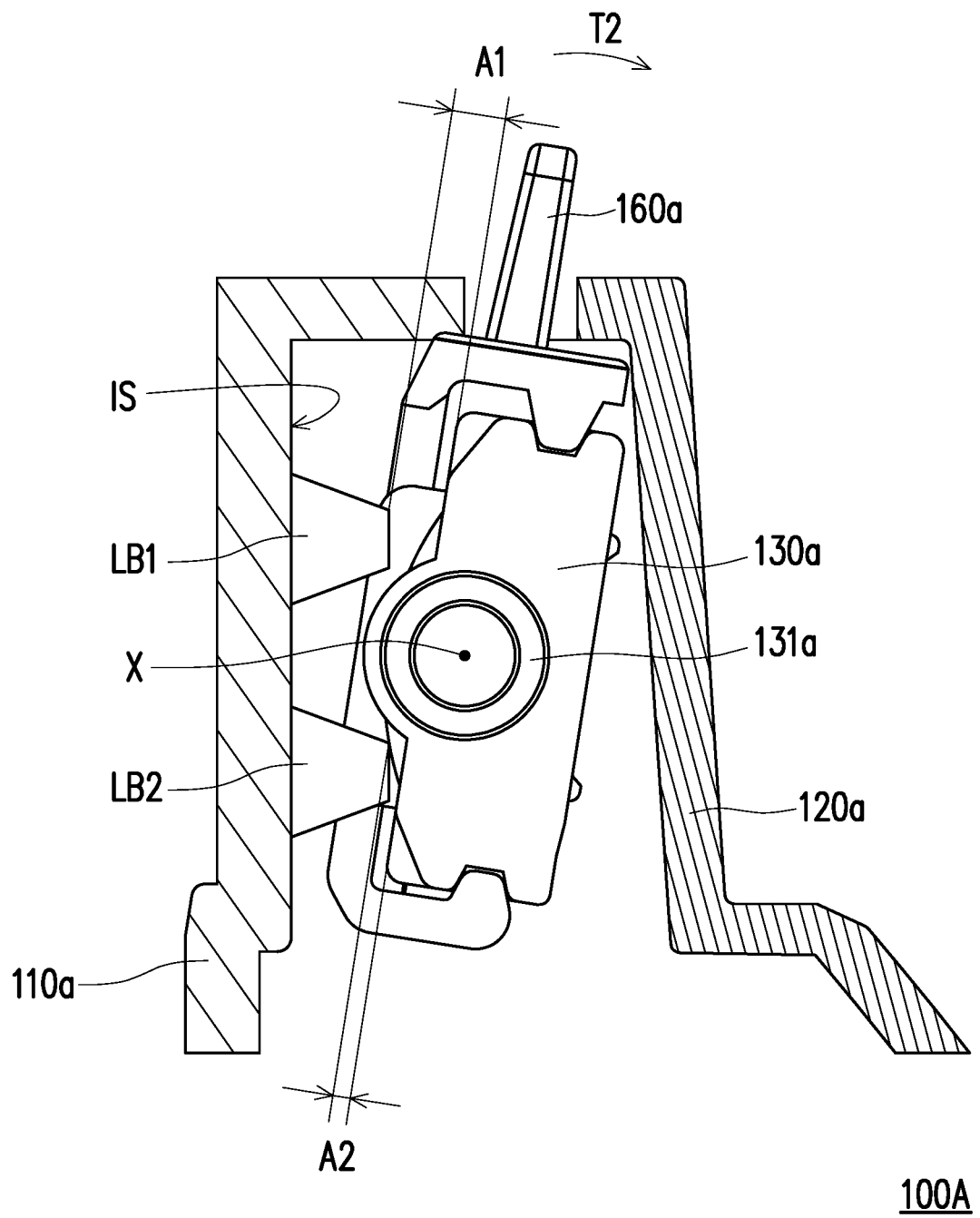
FIG. 3C is a side schematic view of the webcam module of FIG. 3A rotating toward a second rotating direction.

FIG. 3A is a side schematic view of a webcam module combined with a first limiting block and a second limiting block according to another embodiment of the disclosure. FIG. 3B is a side schematic view of the webcam module of FIG. 3A rotating toward a first rotating direction. FIG. 3C is a side schematic view of the webcam module of FIG. 3A rotating toward a second rotating direction.

Please refer to FIG. 3A. The difference between a webcam module 100A of this embodiment and the embodiment of FIG. 1A is that an inner wall surface IS of a front casing 110a of the webcam module 100A facing a support base 130a forms a first limiting block LB1 and a second limiting block LB2. The first limiting block LB1 and the second limiting block LB2 are spaced up and down from each other and respectively have a first gap A1 and a second gap A2 with the support base 130a. The first limiting block LB1 and the second limiting block LB2 are configured to limit a rotating stroke of the support base 130a.

Please refer to FIG. 3A. When the support base 130a is parallel to the front casing 110a, the first gap A1 and the second gap A2 may be equal (or the first gap A1 and the second gap A2 may also be different due to difference in lengths of the first limiting block LB1 and the second limiting block LB2). Please refer to FIG. 3B. When a lever 160a pushes a rotating shaft 131a of the support base 130a to rotate toward a first rotating direction T1 with an axis X as the center, the first gap A1 is less than the second gap A2, that is, the support base 130a tilts forward relative to the front casing 110a. Please refer to FIG. 3C. When the lever 160a pushes the rotating shaft 131a of the support base 130a to rotate toward a second rotating direction T2 opposite to the first rotating direction T1 with the axis X as the center, the first gap A1 is greater than the second gap A2, that is, the support base 130a tilts backward relative to the front casing 110a.

Figure 4A:
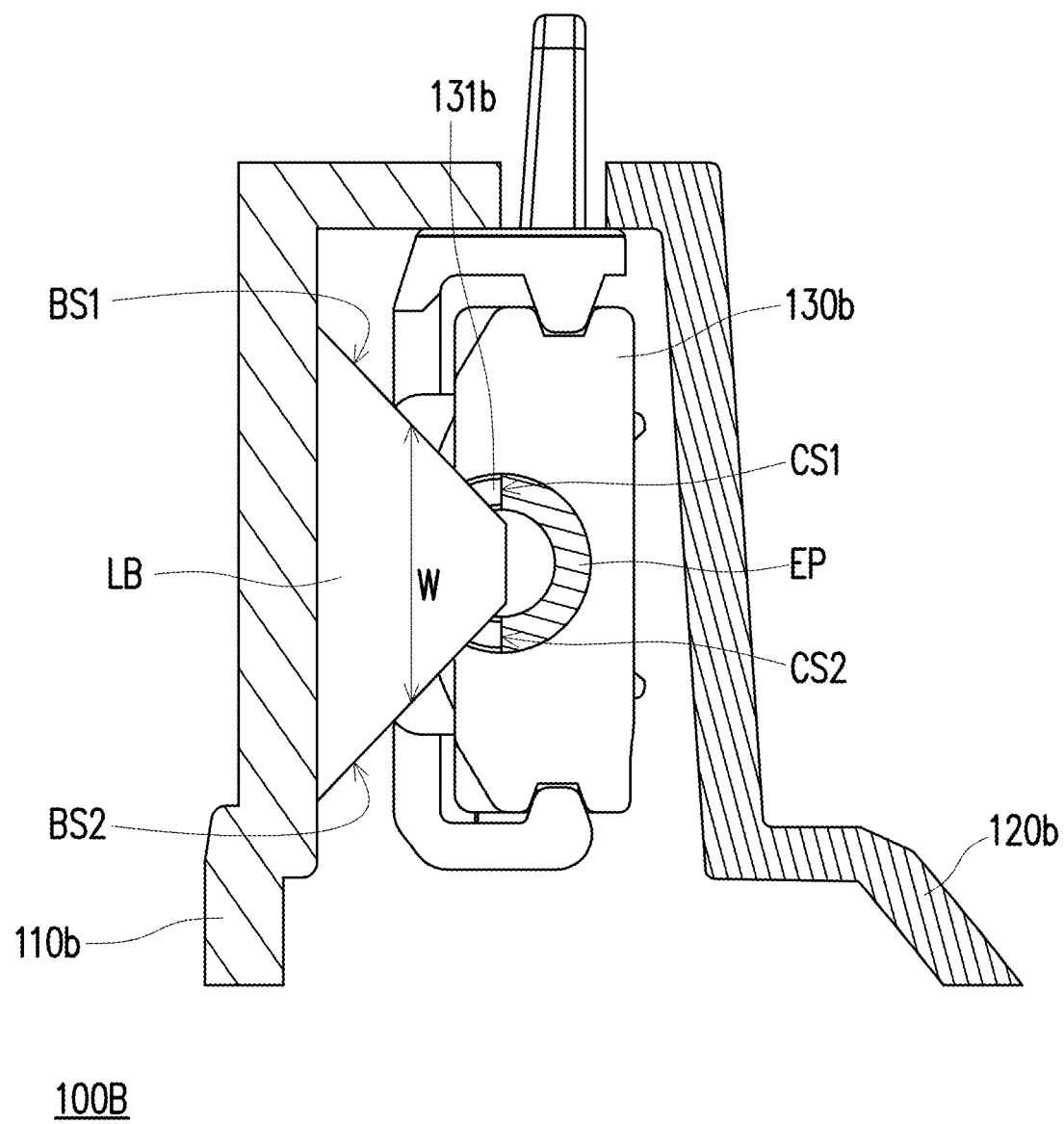
FIG. 4A is a side schematic view of a webcam module combined with an extension portion and a limiting block according to another embodiment of the disclosure.
Figure 4B:
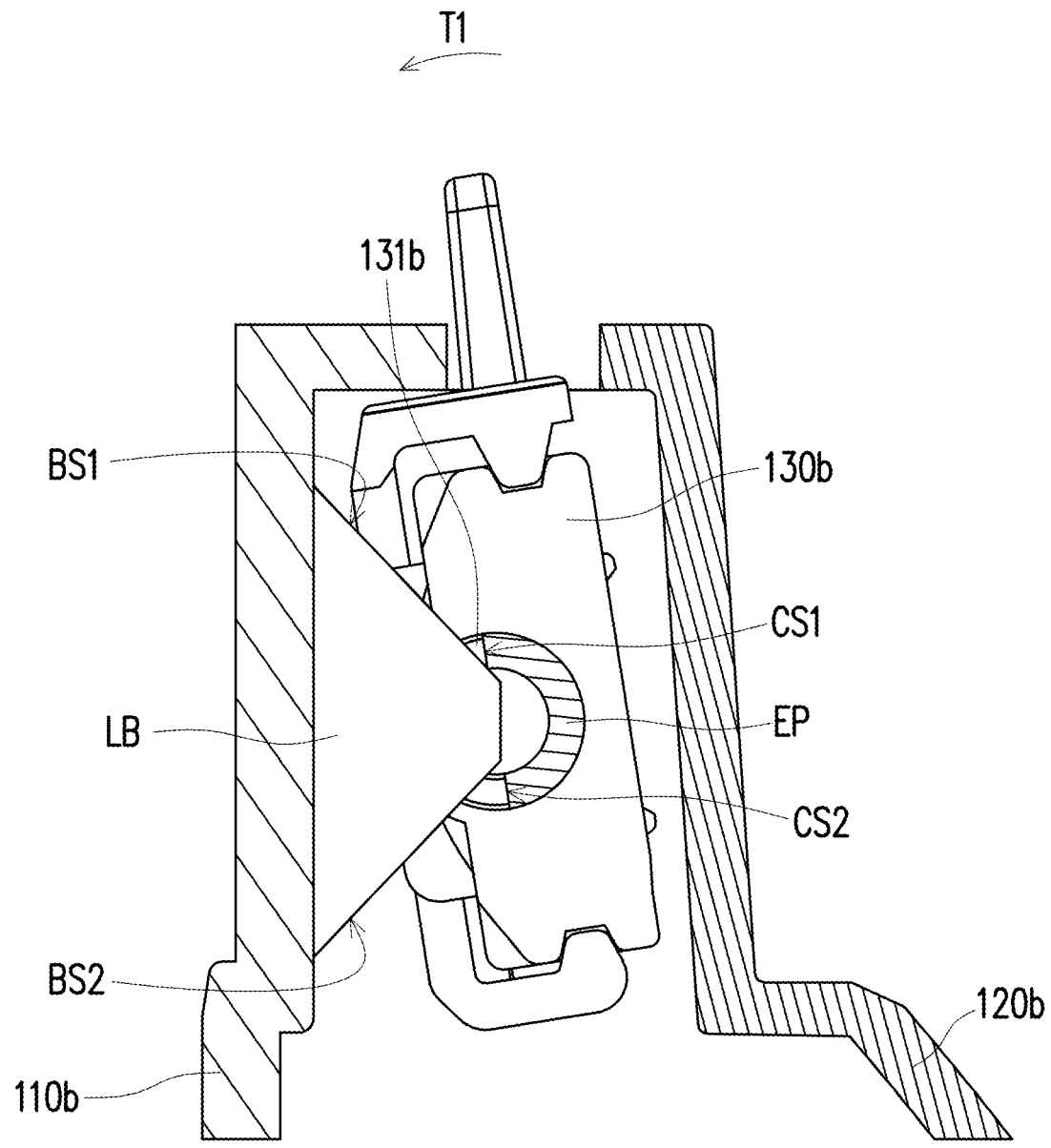
FIG. 4B is a side schematic view of the webcam module of FIG. 4A rotating toward a first rotating direction.
Figure 4C:
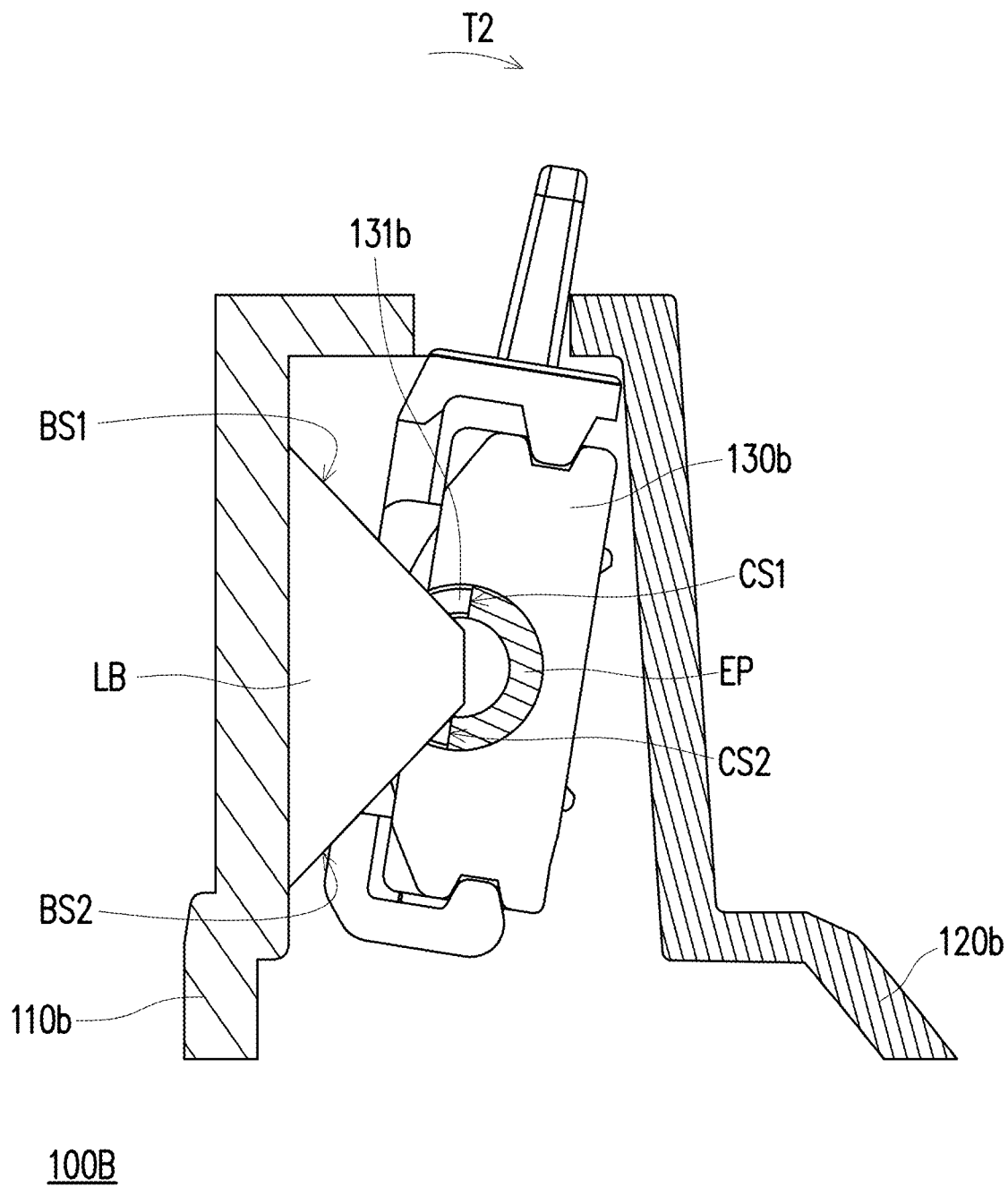
FIG. 4C is a side schematic view of the webcam module of FIG. 4A rotating toward a second rotating direction.

FIG. 4A is a side schematic view of a webcam module combined with an extension portion and a limiting block according to another embodiment of the disclosure. FIG. 4B is a side schematic view of the webcam module of FIG. 4A rotating toward a first rotating direction. FIG. 4C is a side schematic view of the webcam module of FIG. 4A rotating toward a second rotating direction.

Please refer to FIG. 4A. The difference between a webcam module 100B of this embodiment and the embodiment of FIG. 1A is that each rotating shaft 131b of the webcam module 100B has an extension portion EP, and the extension portion EP has a curved structure and has a first contact surface CS1 and a second contact surface CS2. A front casing 110b has two limiting blocks LB, which are respectively positioned with the two extension portions EP of the two rotating shafts 131b. Each limiting block LB has a first bevel BS1 and a second bevel BS2, and a width W of the first bevel BS1 and the second bevel BS2 is tapered toward the extension portion EP.

Please refer to FIG. 4A. When a support base 130b is parallel to the front casing 110b, the limiting block LB is located between the first contact surface CS1 and the second contact surface CS2 of the extension portion EP. Please refer to FIG. 4B. When the support base 130b rotates toward a first rotating direction T1, the first contact surface CS1 of the extension portion EP abuts the first bevel BS1 of the limiting block LB, that is, the support base 130b tilts forward relative to the front casing 110b. Please refer to FIG. 4C. When the support base 130b rotates toward a second rotating direction T2 opposite to the first rotating direction T1, the second contact surface CS2 of the extension portion EP abuts the second bevel BS2, that is, the support base 130b tilts backward relative to the front casing 110b. The first bevel BS1 and the second bevel BS2 of each limiting block LB are configured to limit a rotating stroke of the support base 130a.

Figure 5A:
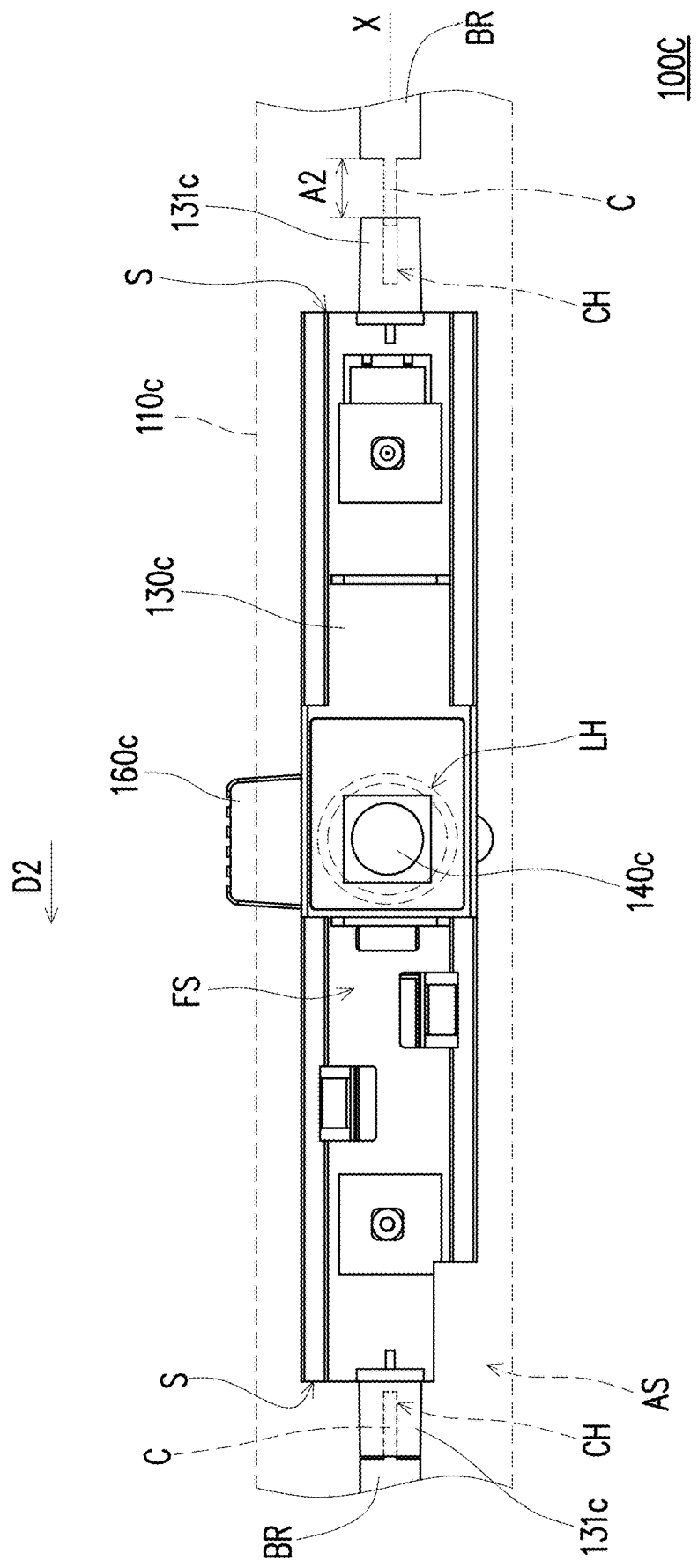
FIG. 5A is a plan schematic view of a webcam module in a turn-on mode according to another embodiment of the disclosure.
Figure 5B:
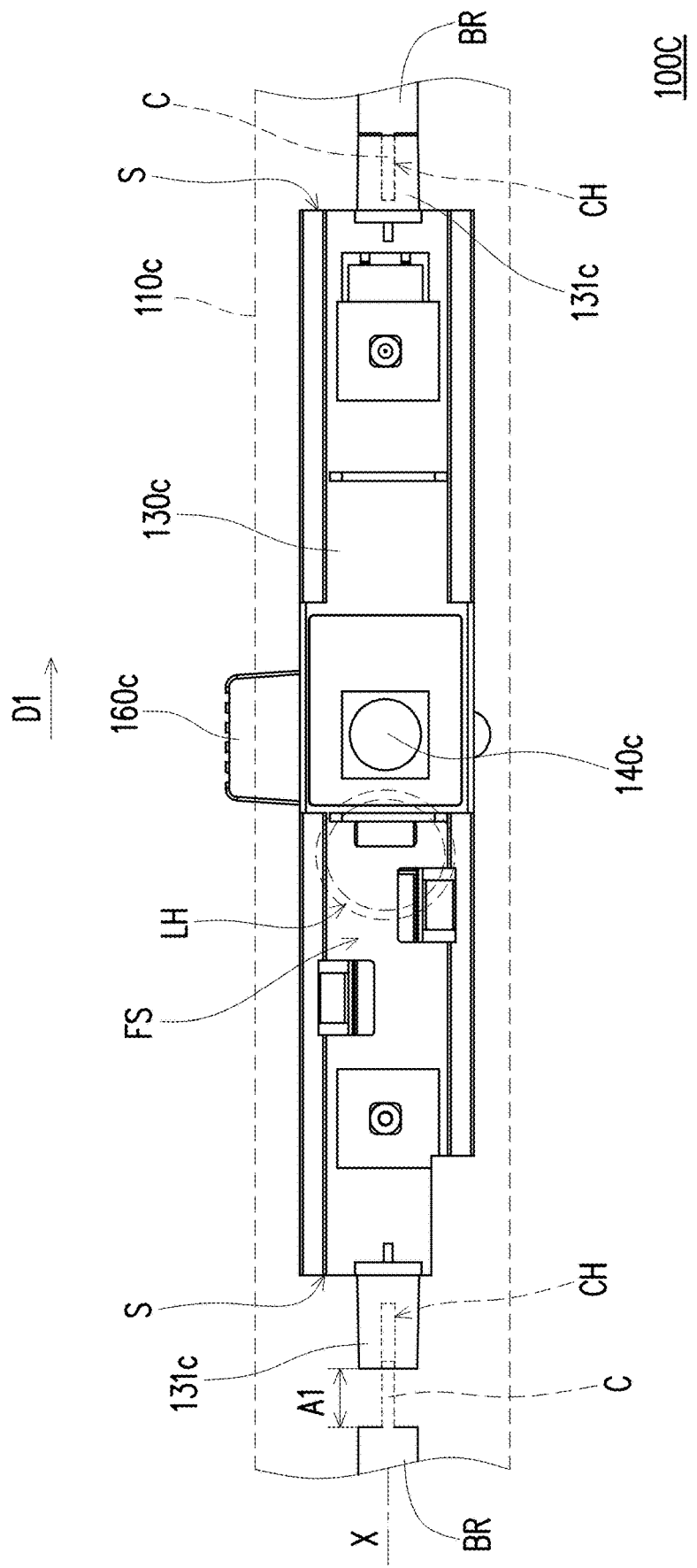
FIG. 5B is a plan schematic view of the webcam module of FIG. 5A in a privacy mode.

FIG. 5A is a plan schematic view of a webcam module in a turn-on mode according to another embodiment of the disclosure. FIG. 5B is a plan schematic view of the webcam module of FIG. 5A in a privacy mode.

Please refer to FIG. 5A and FIG. 5B. The difference between a webcam module 100C of this embodiment and the embodiment of FIG. 1A is that the webcam module 100C includes a front casing 110c, a rear casing (not shown in the drawings, but reference may be made to FIG. 1A), a support base 130c, a lens 140c, and a lever 160c.

The front casing 110c has a lens hole LH. The rear casing 120c is disposed at the front casing 110c and forms an accommodating space AS. The support base 130c is rotatably disposed in the accommodating space AS. The lens 140c is disposed on a front side surface FS of the support base 130c facing the front casing 110c. The lever 160c is connected to the support base 130c and protrudes above the front casing 110c and the rear casing 120c. In the embodiment, the lever 160c is, for example, integrally formed or fixed onto the support base 130c.

Please refer to FIG. 5A and FIG. 5B. The lever 160c is adapted to drive the support base 130c to slide along an axis X to switch to the turn-on mode or the privacy mode. When the support base 130c slides toward a first direction D1, the lens 140c is away from the lens hole LH and overlaps with the front casing 110c, so that the lens 140c is hidden in the front casing 110c (see FIG. 5B). When the support base 130c slides toward a second direction D2 opposite to the first direction D1, the lens 140c is positioned with the lens hole LH, so that the lens 140c is displayed in the lens hole LH (see FIG. 5B).

Please refer to FIG. 5A and FIG. 5B. The support base 130c has two rotating shafts 131c, which are respectively disposed on two side surfaces S of the support base 130c relative to the lens 140c, and the axis X passes through the center of the two rotating shafts 131c. Two bearings BR are disposed on two opposite side surfaces of the front casing or the rear casing along the axis X, and the two rotating shafts 131c are respectively pivotally connected to the two bearings BR.

In detail, each rotating shaft 131c has a concave hole CH, and each bearing BR has a column C. Each column C is rotatably and movably penetrated through each concave hole CH.

Please refer to FIG. 5B. In the privacy mode, the lever 160c drives the support base 130c to slide toward the first direction D1 along the axis X, so that the rotating shaft 131c and the bearing BR on the right side abut each other, and the column C thereof is completely hidden in the concave hole CH, and the rotating shaft 131c on the left side is relatively away from the bearing BR on the left side, so that there is a first gap A1 and the column C of the bearing BR on the left side partially extends outside the rotating shaft 131c on the left side.

Please refer to FIG. 5A. In the turn-on mode, the lever 160c drives the support base 130c to slide toward the second direction D2 along the axis X, so that the rotating shaft 131c and the bearing BR on the left side abut each other, and the column C thereof is completely hidden in the concave hole CH, and the rotating shaft 131c on the right side is relatively away from the bearing BR on the right side, so that there is a second gap A2 and the column C of the bearing BR on the right side partially extends outside the rotating shaft 131c on the right side.

In summary, the webcam module of the disclosure drives the blocking cover to slide along the support base or drives the support base to slide along the axis through the lever, so as to switch the lens to the turn-on mode or the privacy mode. In the turn-on mode, the lens is displayed in the lens hole to facilitate capturing. In the privacy mode, the lens is blocked through the blocking cover or the lens is hidden in the front casing, so that the lens cannot be displayed in the lens hole. Even if a third party remotely controls the lens of the webcam module, under the physical blocking of the blocking cover or the front casing, the third party still cannot infringe on personal privacy through the webcam module.

In addition, the webcam module of the disclosure may directly or indirectly drive the support base to rotate relative to the front casing through the lever to adjust the capturing angle of the lens in the lens hole, so as to adapt to the intensity of the ambient light or present different capturing effects.

What is claimed is:

1. A webcam module, comprising:
    a front casing, having a lens hole;
    a rear casing, disposed at the front casing and forming an accommodating space;
    a support base, rotatably disposed in the accommodating space;
    a lens, disposed on a front side surface of the support base facing the front casing;
    a blocking cover, slidably sleeved around the support base and facing the front casing, wherein the blocking cover has a baffle, an upper slide plate, and a lower slide plate, the baffle overlaps with the front side surface of the support base, the upper slide plate and the lower slide plate are respectively formed on upper and lower ends of the baffle and clamp the support base; and
    a lever, connected to the blocking cover and protruding above the front casing and the rear casing, wherein
    the lever is adapted to drive the blocking cover to slide along the support base to switch to a turn-on mode or a privacy mode, and the lever is adapted to drive the blocking cover and the support base to rotate relative to the front casing with an axis as a center,
    wherein the support base has an upper groove and a lower groove, the upper groove partially overlaps with a limiting groove of the rear casing, and the upper slide plate and the lower slide plate are respectively slidably engaged with the upper groove and the lower groove.

2. The webcam module according to claim 1, wherein when the blocking cover slides toward a first direction along the support base, the blocking cover slides between the lens and the lens hole to block the lens, and when the blocking cover slides toward a second direction opposite to the first direction along the support base, the blocking cover is away from the lens and the lens hole, and the lens is displayed in the lens hole.

3. The webcam module according to claim 1, wherein the support base has two rotating shafts respectively disposed on two side surfaces of the support base relative to the lens, the axis passes through a center of the two rotating shafts, two bearings are disposed on the front casing, and the two rotating shafts are respectively pivotally connected to the two bearings.

4. The webcam module according to claim 3, wherein the rear casing has a limiting groove, and the lever is movably located in the limiting groove.

5. The webcam module according to claim 4, wherein when the support base rotates toward a first rotating direction, the lever abuts the front casing in the limiting groove, and when the support base rotates toward a second rotating direction opposite to the first rotating direction, the lever abuts the rear casing in the limiting groove.

6. The webcam module according to claim 1, wherein the support base has two baffles extending on the front side surface of the support base and respectively located on two sides of the blocking cover to limit a sliding stroke of the blocking cover on the support base.

7. The webcam module according to claim 1, wherein an inner wall surface of the front casing facing the support base forms a first limiting block and a second limiting block, and the first limiting block and the second limiting block are spaced up and down from each other and respectively have a first gap and a second gap with the support base.

8. The webcam module according to claim 7, wherein when the support base is parallel to the front casing, the first gap and the second gap are equal, when the support base rotates toward a first rotating direction, the first gap is less than the second gap, and when the support base rotates toward a second rotating direction opposite to the first rotating direction, the first gap is greater than the second gap.

9. The webcam module according to claim 2, wherein each of the rotating shafts has an extension portion, the front casing has two limiting blocks respectively positioned with the extension portions, each of the limiting blocks has a first bevel and a second bevel, and a width of each of the first bevel and the second bevel is tapered toward the extension portion.

10. The webcam module according to claim 9, wherein when the support base rotates toward a first rotating direction, a first contact surface of the extension portion abuts the first bevel, and when the support base rotates toward a second rotating direction opposite to the first rotating direction, a second contact surface of the extension portion abuts the second bevel.

* * * * *